United States Patent [19]
Balsdon

[11] Patent Number: 5,348,252
[45] Date of Patent: Sep. 20, 1994

[54] VECTORABLE NOZZLE MOUNTING

[75] Inventor: Julian G. Balsdon, Bristol, Great Britain

[73] Assignee: Rolls-Royce plc, London, Great Britain

[21] Appl. No.: 36,873

[22] Filed: Mar. 25, 1993

[30] Foreign Application Priority Data

May 16, 1992 [GB] United Kingdom ............... 9210547

[51] Int. Cl.⁵ ............................................. B64D 33/04
[52] U.S. Cl. ..................................... 244/52; 244/12.4; 244/23 D; 239/127.1
[58] Field of Search ................... 244/12.4, 23 C, 52, 244/53 R, 54; 239/265.11, 265.17, 295.19, 127.1, 127.3

[56] References Cited

FOREIGN PATENT DOCUMENTS

| | | |
|---|---|---|
| 706774 | 4/1954 | United Kingdom . |
| 871110 | 6/1961 | United Kingdom . |
| 881662 | 11/1961 | United Kingdom . |
| 991220 | 5/1965 | United Kingdom . |
| 1018581 | 1/1966 | United Kingdom . |

OTHER PUBLICATIONS

Rolls-Royce, "The Jet Engine", published 1986, Rolls-Royce; Figure 18—6, p. 190.

Primary Examiner—Galen L. Barefoot
Attorney, Agent, or Firm—Oliff & Berridge

[57] ABSTRACT

A vectorable nozzle mounting for an engine installation in a VSTOL aircraft in which hot gas nozzles are mounted on the airframe is described. A swivelable nozzle is mounted by means of a bearing on an intermediate fixed member such as a mounting ring on the airframe. The hot exhaust gas is discharged into the nozzle through a stub duct carried by the engine casing. Misalignment and movement between the duct and the nozzle is accommodated by movable sealing rings carried in the intermediate member which engage the outer surface of the duct. The sealing rings are spaced apart to form an annular chamber which is supplied with cooling air at a higher pressure than the pressure in the exhaust duct. The cooling air is arranged to cool the nozzle bearing and leakage passed the seals is of cooling air into the nozzle thus excluding hot exhaust gas from the engine bay.

19 Claims, 1 Drawing Sheet

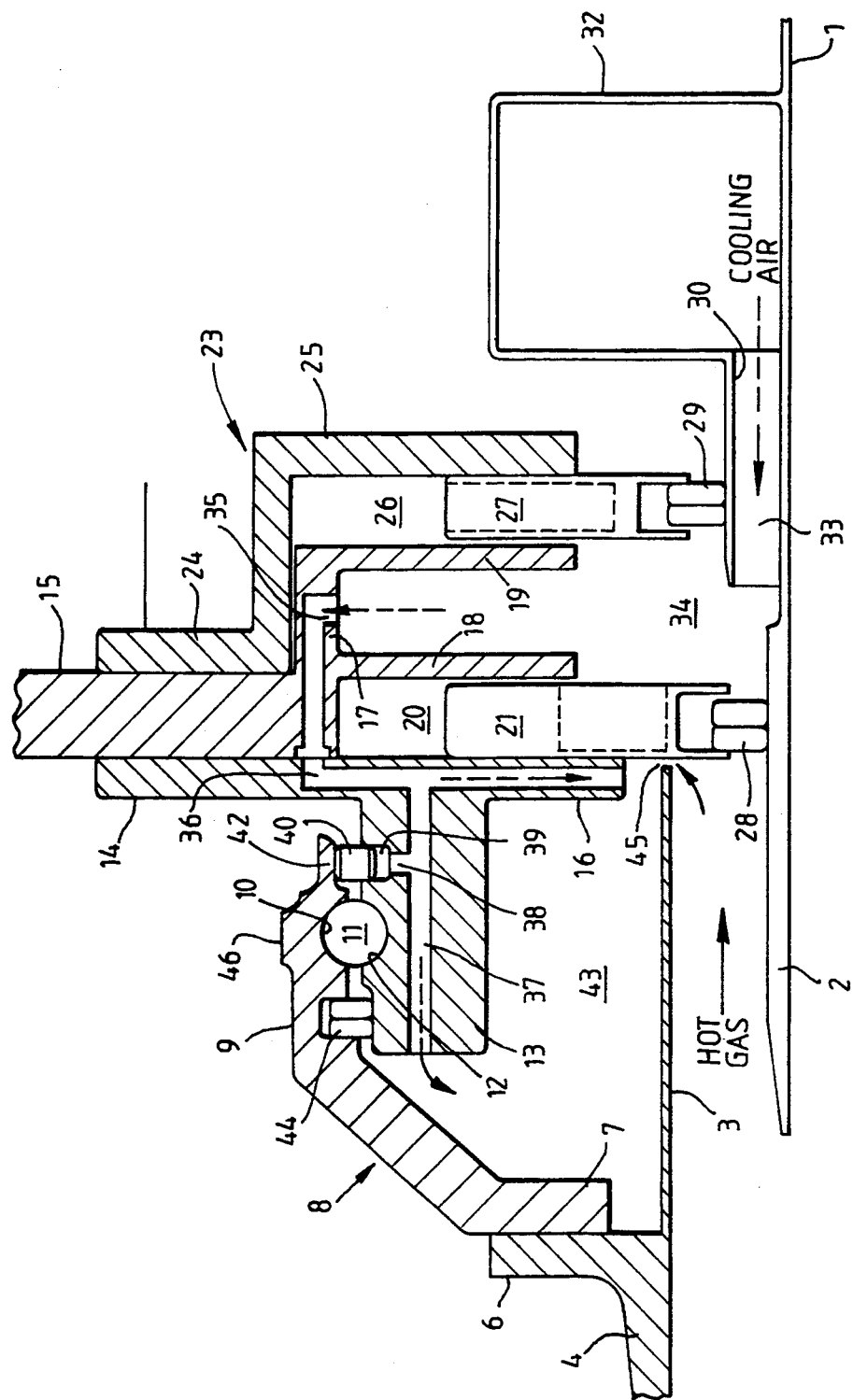

VECTORABLE NOZZLE MOUNTING

BACKGROUND OF THE INVENTION

This invention relates to gas turbine engines. In particular it concerns a vectorable nozzle mounting for a gas turbine engine for a vertical and short take off and landing aircraft.

In the field of vertical and short take-off and landing aircraft gas turbines are often adapted to provide thrust for both normal wing-borne flight and for lift. This is achieved using vectorable nozzles for changing the direction of the engine thrust. For stability and ease of aircraft control an existing engine of this type employs an arrangement which uses four side mounted nozzles which can be rotated on simple bearings through an angle of over ninety degrees. Two of the nozzles are located forward of the aircraft centre of gravity on port and starboard sides and receive air from the engine compressor. The other two nozzles are located rearward of the centre of gravity on port and starboard sides and receive exhaust gas from the turbine section.

The absence of a conventional axial jet pipe in the basic arrangement enables the rear structure of the engine to incorporate a permanent transverse portion which acts as a gas deflector and strengthens the structure with respect to torsional loads. The rearward pair of nozzles can then be carried by the engine casing which greatly eases problems of sealing the nozzles against hot gas leakage. In a development of this type of arrangement which incorporates an axial jet pipe the transverse portion of the rear structure no longer exists and the torsional loading of the rear nozzles can no longer be tolerated. The nozzles can be carried by the airframe in which case a solution must be found to the difficulty of controlling hot gas leakage from means connecting the engine to the nozzles.

Accordingly it is an object of the present invention to provide a vectorable nozzle arrangement for a gas turbine engine installation in a vertical and short take-off and landing aircraft.

SUMMARY OF THE INVENTION

According to one aspect of the invention in it most general form a mounting arrangement for a vectorable nozzle in a gas turbine engine installation comprising:

a nozzle, a duct having an outlet for discharging gas from the engine into the nozzle, a support member formed with an aperture therein and carrying bearing means which rotatably mounts the nozzle coaxially with said aperture, the duct outlet being received into the aperture formed in said support member, said aperture being formed with a periphery which is spaced apart from the duct to define an annular gap therebetween, and sealing means for sealing the annular gap to prevent incursion of engine exhaust gases between the duct and support member.

Preferably the bearing means comprises inner and outer relatively rotatable bearing members and the cooling means includes passage means for receiving cooling air from a manifold. A nozzle may be secured to the outer bearing member for rotation therewith and the inner bearing may be secured to a stationary member forming part of the engine structure or an aircraft structure.

According to the invention an aircraft including a mounting arrangement for a vectorable nozzle in a gas turbine engine installation, the mounting arrangement comprising:

a nozzle, a duct having an outlet for discharging gas from the engine into the nozzle, a support member formed with an aperture therein and carrying bearing means which rotatably mounts the nozzle coaxially with said aperture, the duct outlet being received into the aperture formed in said support member, said aperture being formed with a periphery which is spaced apart from the duct to define an annular gap therebetween, and sealing means for sealing the annular gap to prevent incursion of engine exhaust gases between the duct and support member.

BRIEF DESCRIPTION OF THE DRAWINGS

One embodiment of the invention will now be described by way of example only with reference to the accompanying drawing which shows a longitudinal section through part of a vectorable nozzle mounting of a gas turbine engine installation, the arrangement being provided with a cooling air supply system.

DESCRIPTION OF THE PREFERRED EMBODIMENTS

An engine exhaust gas duct 1 is coupled at one end to the jet pipe (not shown) of a gas turbine engine. A proportion of the engine exhaust gas may be diverted from the jet pipe through the duct 1 to issue from a vectorable nozzle. The distal end 2 of the duct 1 projects into a sleeve 3 integral with the nozzle 4. The nozzle is mounted for rotation about an axis 5. The nozzle 4 has a radially outward circumferential flange 6 which is connected to a corrresponding flange 7 extending radially inwards from a frusto-conical member 8. The cylindrical outer end 9 of member 8 forms an outer ball race of a nozzle bearing. The outer ball race member 10 has a raceway for ball bearings 11 which also locate in a second raceway 12 formed in an inner race member 13. The member 13 is part of an intermediate member provided with an outwardly extending radial flange 14 whereby the member 13 may be bolted to a fixed mounting ring 15 which may comprise part of the aircraft airframe. A radial flange 16 extends inwardly of the race member 13. The mounting ring 15 is formed with a cylindrical flange 17 from which extend radial flanges 18,19 directed inwardly towards the axis 5. The flanges 16 and 18 provide an annular recess 20 to receive an annular sealing ring carrier 21.

A stepped annular member 23 has an outwardly directed flange 24 by means of which it is attached to the mounting ring 15. It also has an inwardly directed flange 25 which forms an annular recess 26 with the radial flange 19 extending from the flange 17 of the mounting ring 15. This recess 26 receives a second annular sealing ring carrier 27. The sealing ring carrier 21 is recessed at its inner edge to receive sealing rings 28 which bear against the outer wall surface of the duct 1. The sealing ring carrier 27 is also recessed at its inner edge to receive sealing rings 29 which bear against a sleeve 30 co-axial with the duct 1.

Collectively, inner race member 13, radial flanges 14 and 16, mounting ring 15, and stepped annular member 23 define a suport member which is adapted to carry the nozzle 4 for rotation.

The sleeve 30 extends from an annular cooling air manifold 32 secured to the periphery of the duct 1 and coupled to a source (not shown) of cooling air. The sleeve 30 provides with the outer wall surface of the duct 1 an annular passage 33 whereby cooling air in the manifold 32 is conveyed into an annular chamber 34 formed with the piston ring 27 and flange 19 on one side and the piston ring 21 and flange 18 on the other.

The flange 17 on the mounting ring 15 is apertured at 35 to receive cooling air from chamber 34 and direct it into a passageway 36 in the flange 14 of the inner race member 13. From the passageway 36 extends a second passageway 37 from which extend a number of circumferentially spaced radial bores 38 opening into an annular recess 39. A sealing ring 40 is received into the recess 39 and is maintained in engagement with a short flange 42 extending from the cylindrical end 9 of the outer race member 10.

The passageway 37 opens into a chamber 43 formed by the interior of the frusto-conical member 8 and bounded by the inner race member 13, the inwardly directed flange 16 and the sleeve 3 extending from the nozzle 4. Sealing rings 44 are provided between the race members 9 and 13 to prevent outward flow of cooling air from the chamber 43. However, a small gap 45 is provided between the end of sleeve 3 and the side face of sealing ring carrier 21 to allow for relative movement between the sleeve and sealing ring due to thermal effects and to prevent the build up of pressure in the chamber 43.

In order to be able to swivel the nozzle by rotating it about the axis 5 sprocket teeth 46 are provided on the outer surface of the cylinder 9 in which the outer raceway 10 is formed. These teeth are engaged by a chain (not shown) forming part of the nozzle swivel drive system.

In operation, hot engine exhaust is admitted into the nozzle 4 by way of the duct 1. Cooling air at a pressure higher than the pressure of the hot exhaust gas is directed into the manifold 32 from where it passes through the annular passage 33 and into the chamber 34. The cooling air escapes from the chamber 34 by way of the apertures 35 and passageways 36 and 37 into the chamber 43 cooling the bearing raceways 10,12 and the sprocket teeth 46 as it does so. Thus the bearing raceways are protected from the heat of the exhaust gas flowing through the duct 1 and into the nozzle 4 and are not subject to unduly elevated temperatures.

Depending upon the pressure difference between the chamger 43 and duct 1 there will be leakage of cool air into the duct or of hot exhaust gas into the chamber. The effect of hot gas entering the chamber 43 will be substantially diluted if not completely avoided by mixing with the cooling air supply. Different conditions may apply around the circumference of the gap 45 for example as the nozzle is rotated.

One effect of the introduction of hot exhaust gas into the duct 1 is to increase the diameter of the duct. This is accommodated by the sealing rings 28,29 in the carrier rings 21,27. It can be seen that any misalignment arising between the duct 1 and mounting ring 15 during engine operation is automatically compensated by the ability of the sealing rings 21,27 to shift position in their housing recesses 20,26 so that complete sealing is provided at all times with no leakage into the surrounding engine bay.

I claim:

1. A mounting arrangement for a vectorable nozzle in a gas turbine engine installation comprising:
   a nozzle,
   a duct having an outlet for discharging gas from the engine into the nozzle,
   a support member formed with an aperture therein and carrying bearing means which rotatably mounts the nozzle coaxially with said aperture,
   the duct outlet being received into the aperture formed in said support member, said aperture being formed with a periphery which is spaced apart from the duct to define an annular gap therebetween, and
   sealing means for sealing the annular gap to prevent incursion of engine exhaust gases between the duct and support member.

2. Apparatus as claimed in claim 1 further comprising means for supplying cooling air to the bearing means during engine operation.

3. Apparatus as claimed in claim 2 wherein the sealing means comprises a pair of axially spaced apart ring seals each of which cooperate with the duct to define an annular chamber therebetween, whereby the annular chamber is adapted to receive cooling air.

4. Apparatus as claimed in claim 3 wherein the support member is formed with internal passageways which receive cooling air from the annular chamber for cooling the bearing means.

5. Apparatus as claimed in claim 3 wherein the ring seals each comprise at least one sealing ring seated in a recess defined in the inner surface of a carrier ring which is itself seated in a recess defined in the inner surface of the support member, the carrier ring having an external diameter less than the internal diameter of the recess in the support member so as to be slidable radially therein.

6. Apparatus as claimed in claim 3 further comprising manifold means for distributing cooling air into the annular chamber.

7. Apparatus as claimed in claim 6 wherein the manifold is co-axial with the duct.

8. Apparatus as claimed in claim 3 wherein the annular chamber is adapted to receive cooling air at a pressure higher than the pressure of gas in the duct.

9. An aircraft including a mounting arrangement for a vectorable nozzle in a gas turbine engine installation, the mounting arrangement comprising:
   a nozzle,
   a duct having an outlet for discharging gas from the engine into the nozzle,
   a support member formed with an aperture therein and carrying bearing means which rotatably mounts the nozzle coaxially with said aperture,
   the duct outlet being received into the aperture formed in said support member, said aperture being formed with a periphery which is spaced apart from the duct to define an annular gap therebetween, and
   sealing means for sealing the annular gap to prevent incursion of engine exhaust gases between the duct and support member.

10. An aircraft as claimed in claim 9 further comprising means for supplying cooling air to the bearing means during engine operation.

11. An aircraft as claimed in claim 10 wherein the sealing means comprises a pair of axially spaced apart ring seals each of which cooperate with the duct to define an annular chamber therebetween, whereby the annular chamber is adapted to receive cooling air.

12. An aircraft as claimed in claim 11 wherein the support member is formed with internal passageways which receive cooling air from the annular chamber for cooling the bearing means.

13. An aircraft as claimed in claim 11 wherein the ring seals each comprise at least one sealing ring seated in a recess defined in the inner surface of a carrier ring which is itself seated in a recess defined in the inner surface of the support member, the carrier ring having an external diameter less than the internal diameter of the recess in the support member so as to be slidable radially therein.

14. An aircraft as claimed in claim 11 comprising manifold means for distributing cooling air into the annular chamber.

15. An aircraft as claimed in claim 14 wherein the manifold is co-axial with the duct.

16. An aircraft as claimed in claim 11 wherein the annular chamber is adapted to receive cooling air at a pressure higher than the pressure of gas in the duct.

17. An aircraft as claimed in claim 11 wherein the support member forms part of the aircraft airframe structure.

18. An aircraft as claimed in claim 11 wherein the cooling air comprises engine fan or compressor delivery air.

19. An aircraft as claimed in claim 11 wherein the engine exhaust gases comprise turbine exhaust gases.

* * * * *